Dec. 22, 1970  H. L. MOWBRAY  3,549,219

BEARING AND HUB ASSEMBLY

Filed Oct. 6, 1969  2 Sheets-Sheet 1

INVENTOR.
HARRY L. MOWBRAY
BY Miller & Brown
ATTORNEYS

Dec. 22, 1970    H. L. MOWBRAY    3,549,219
BEARING AND HUB ASSEMBLY
Filed Oct. 6, 1969    2 Sheets-Sheet 2
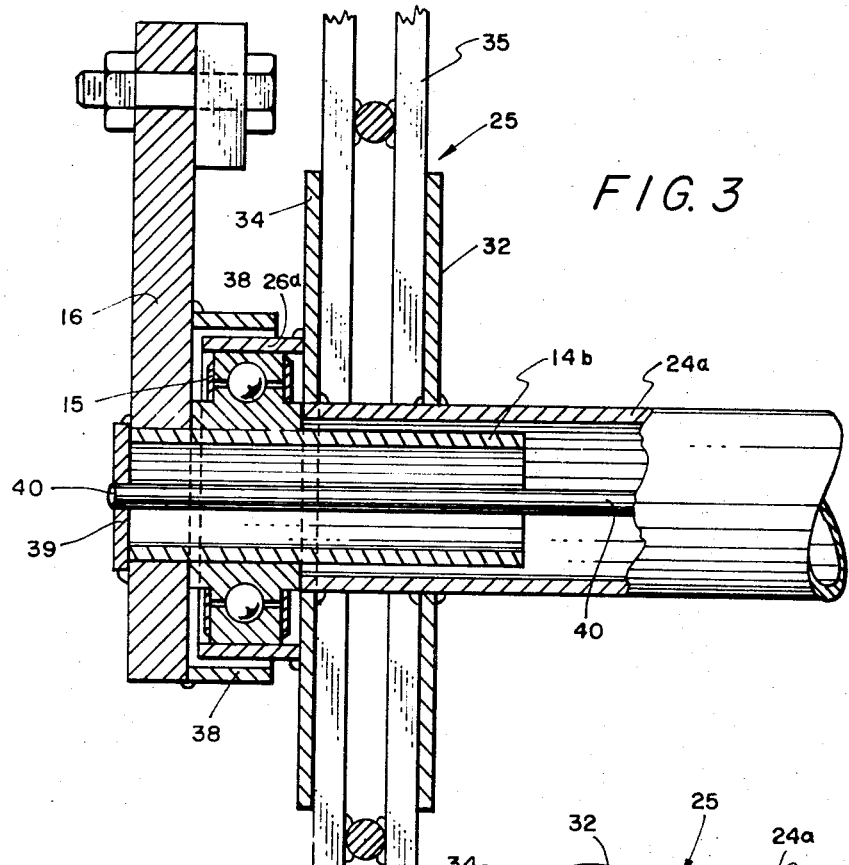
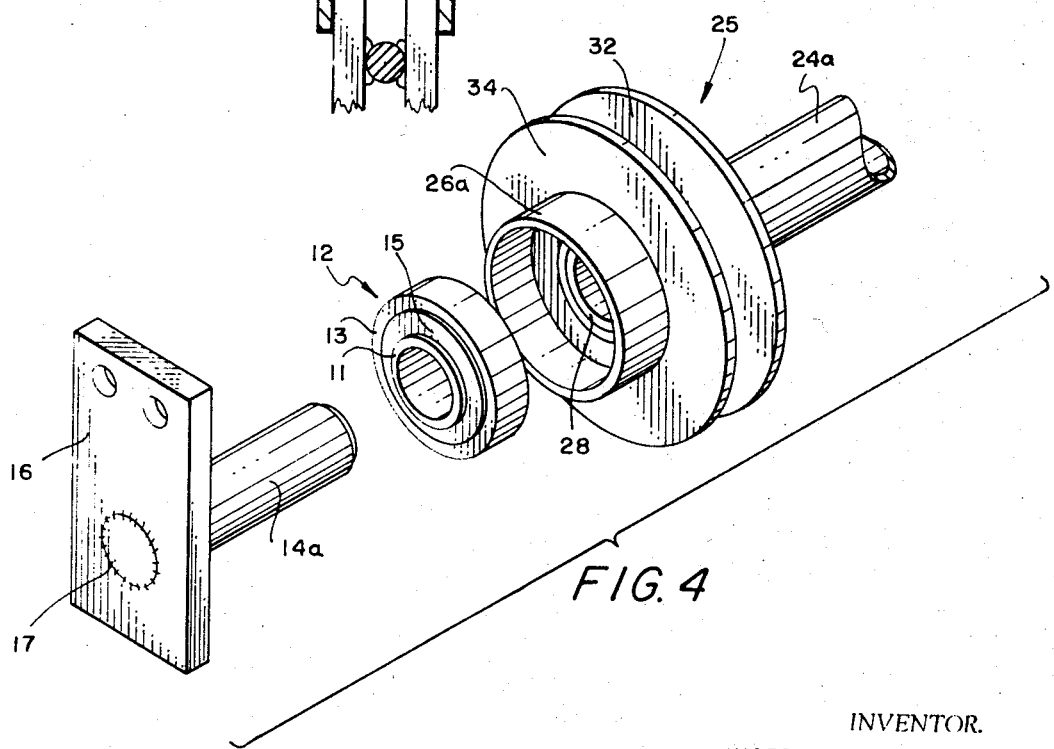
INVENTOR.
HARRY L. MOWBRAY
ATTORNEYS

United States Patent Office 3,549,219
Patented Dec. 22, 1970

3,549,219
BEARING AND HUB ASSEMBLY
Harry L. Mowbray, 109 S. 3rd St.,
Medford, Okla. 73759
Filed Oct. 6, 1969, Ser. No. 863,851
Int. Cl. F16c 13/02
U.S. Cl. 308—181                2 Claims

ABSTRACT OF THE DISCLOSURE

The invention is an improved bearing carrier for supporting a gang of rotary agricultural tillage implements on a common shaft. The anti-friction bearings are positioned inside the ends of a rotating hub shaft with the inner race of the bearing being supported by a stationary stub axle whereby the bearing is protected from trash balling-up on the rotary shaft and destroying the bearing seals.

BACKGROUND OF THE INVENTION

In "stubble mulch" farming a residue of stubble from the previous crop is left standing in the field to protect against wind and water erosion. When the ground is worked by a spiked-tooth harrow, a certain amount of this residue along with other types of trash such as bailing wire will ball-up on the rotating shaft. The accumulating trash will surround and rub against the conventional pillow block bearings destroying their seals and causing the bearing to fail. Bearing failures of this type are responsible for over 90% of the bearing maintenance on spiked-tooth and disc harrows. Agriculture implements of this type, particularly a disc harrow, experience very substantial thrust loads as well as radial loads due to the soil reaction on the discs, and, therefore, require a sealed roller type bearing. Due to the abrasive environment in which these implements are used, the bearings must be kept sealed or they will quickly fail.

The conventional pillow block ball bearings presently being used in the industry are positioned on the outside of the rotating shaft with the outer race and seal being stationary while the inner race rotates with the shaft. The side areas of the bearing are fully exposed to anything that might wrap around the shaft.

The present invention positions the ball bearing cartridge inside the rotating shaft so that the outer race and seal rotate with the shaft while the inner race is supported on a stationary stub axle. When a piece of bailing wire is picked up in the field and wraps around the rotating shaft, the side areas of the bearing are not directly exposed to the wire. Even if they were exposed, the bearing seal and outer race would be rotating with balled-up wire. Therefore, the abrading of wire against the bearing seal is still prevented.

The principal object of the present invention is providing an improved hub and bearing assembly for a gang tillage implement with a hub structure which prevents injurious substances from abrading against the bearing seals and causing failure of the bearing.

Another object of the invention is to provide a simplified hub and bearing structure whereby the side area of the bearing rotates with the rotating shaft.

A further object of the invention is to provide a hub and bearing structure positioned inside the rotating shaft which it supports to minimize bearing contact with wire or other types of trash which become entangled therewith.

Another object of the invention is to provide a hub and bearing structure having multiple type bearings positioned inside the rotating shaft.

Further objects and advantages of the invention will be in part apparent and in part pointed out specifically hereinafter in connection with the description of the drawings that follows and in which:

FIG. 3 is a longitudinal sectional view illustrating an additional modification of the invention; and FIG. 4 is an exploded perspective view of the FIG. 2 embodiment.

Figure 1:
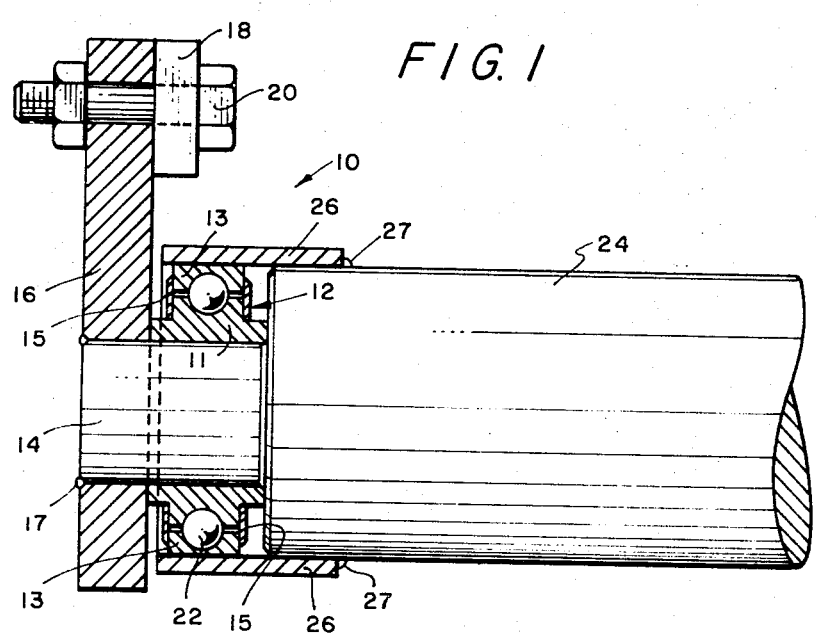
FIG. 1 is a fragmentary longitudinal sectional view of a hub and bearing structure positioned on the end of a rotating shaft.
Figure 2:
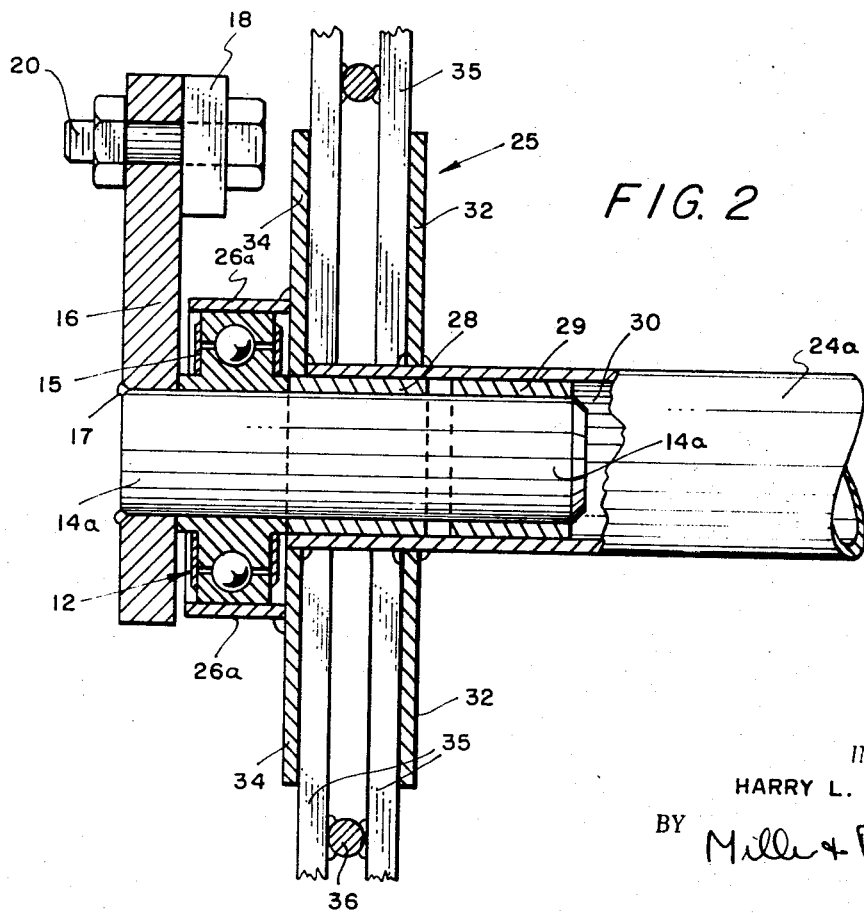
FIG. 2 is a longitudinal sectional view similar to FIG. 1 showing a modified embodiment of the invention.

Referring now to the drawings for a detailed description of the invention and more specifically to FIG. 1, the basic hub and bearing assembly is generally identified by reference numeral 10. While the frictionless bearing cartridge 12 illustrated is of the ball bearing type, other types such as roller, tapered roller or needle may be used. The bearing cartridge 12 is press-fitted to a stub axle 14 which is in turn anchored to a support bracket 16 by an annular weld 17. The bracket 16 is attached to the frame of the implement 18 by bolt 20. Only a portion of the frame 18 is shown since the remainder of the implement has no relevancy to the invention. Bearing cartridge 12 is a conventional sealed ball bearing having an inner race 11 and an outer race 13. Positioned on both sides of the bearing are seals 15 which retain the lubricant inside the bearing and keep abrasive materials out. Welded to the outer end of a shaft 24 is a hub sleeve 26 which receives the bearing 12. The shaft 24 supports a gang of tillage wheels or discs spaced along its length, which are also not shown since they are not a part of the invention. An illustration of one type of tillage wheel 25 is shown in FIG. 2. The opposite end of rotating shaft 24 is supported by a similar bearing and hub assembly 10.

In the FIG. 2 embodiment the wheel supporting shaft 24a is hollow rather than solid as seen in FIG. 1. The stub axle 14a extends into shaft 24a with its right hand end acting as a journal for bearing sleeves 28 and 29. These inboard sleeve bearings, which are press-fitted into the shaft, provide added support for heavy radial loadings on the shaft 24a. The inter space 30 of the shaft can be filled with an oil providing lifetime lubrication for the inboard bearings 28 and 29. Welded to each end of the shaft 24a is a spiked-tooth wheel 25. The wheel is a welded construction made up of inner and outer disc members 32 and 34 which position a plurality of radially spaced spiked teeth 35, partially shown. The teeth are spaced apart by a ring 36. Welded to the outer surface of disc member 34 is a hub sleeve 26a which receives a press-fitted bearing cartridge 12 as described in the previous figure.

FIG. 4 merely shows an exploded view of the hub and bearing assembly 10 with the spiked teeth omitted.

FIG. 3 includes a dirt protective collar 38 welded to bracket 16 which overlaps the hub sleeve 26a. The stub axle 14b is tubular, with a welded plate 39 closing its outer end. A rod 40 passing through the center of axle 14b, is welded to plate 39. The rod is threaded at its opposite end, (not shown), to receive a nut for retaining the two hub and bearing assemblies 10 on the shaft 24b. This embodiment contains only a single bearing 12, as shown in FIG. 1.

In all of the embodiments shown, the seals 15 of the bearing cartridges 12 are not exposed to any material which might wind around the shaft 24 or the hub sleeve 26. The FIG. 3 embodiment includes an additional sleeve 38 which prevents dirt from entering the open side of sleeve 26a. In the multiple bearing embodiment of FIG. 2, the inward bearings 28 and 29 are completely sealed from exposure to any dirt or trash.

What is claimed is:

1. A bearing and hub assembly for supporting a gang of rotating tillage members on the frame of an agriculture implement comprising:
- a rotating shaft adapted to carry at least one tillage member; a disc member integrally attached in flush relation with an end of the shaft;
- a separate hub sleeve having a greater diameter than the shaft, said hub sleeve attached to side disc member;
- a roller type bearing cartridge having an inner and outer race with a bearing seal moving with the outer race positioned in contacting relation inside the hub sleeve;
- bracket supporting means attached to the frame of the implement;
- a stub axle rigidly mounted on the bracket means supporting the inner race of the bearing cartridge whereby the inner race is stationary while the outer race rotates with the shaft and said rotating shaft is of tubular construction with at least one bearing sleeve fitted and secured inside the shaft approximate its ends, and the stub axle extends into the bearing sleeve whereby a portion of the stub axle functions as a journal of the bearing sleeve.

2. A bearing and hub assembly as set forth in claim 1, wherein the disc member comprises a portion of one of the tillage members.

References Cited

UNITED STATES PATENTS

| | | | |
|---|---|---|---|
| 2,540,661 | 2/1951 | Evans et al. | 308—181 |
| 2,586,490 | 2/1952 | Thompson | 308—181 |

FRED C. MATTERN, Jr., Primary Examiner

F. SUSKO, Assistant Examiner